No. 858,533. PATENTED JULY 2, 1907.
J. PETERSON.
HAY AND MANURE GATHERER AND LOADER.
APPLICATION FILED FEB. 26, 1906.
4 SHEETS—SHEET 1.
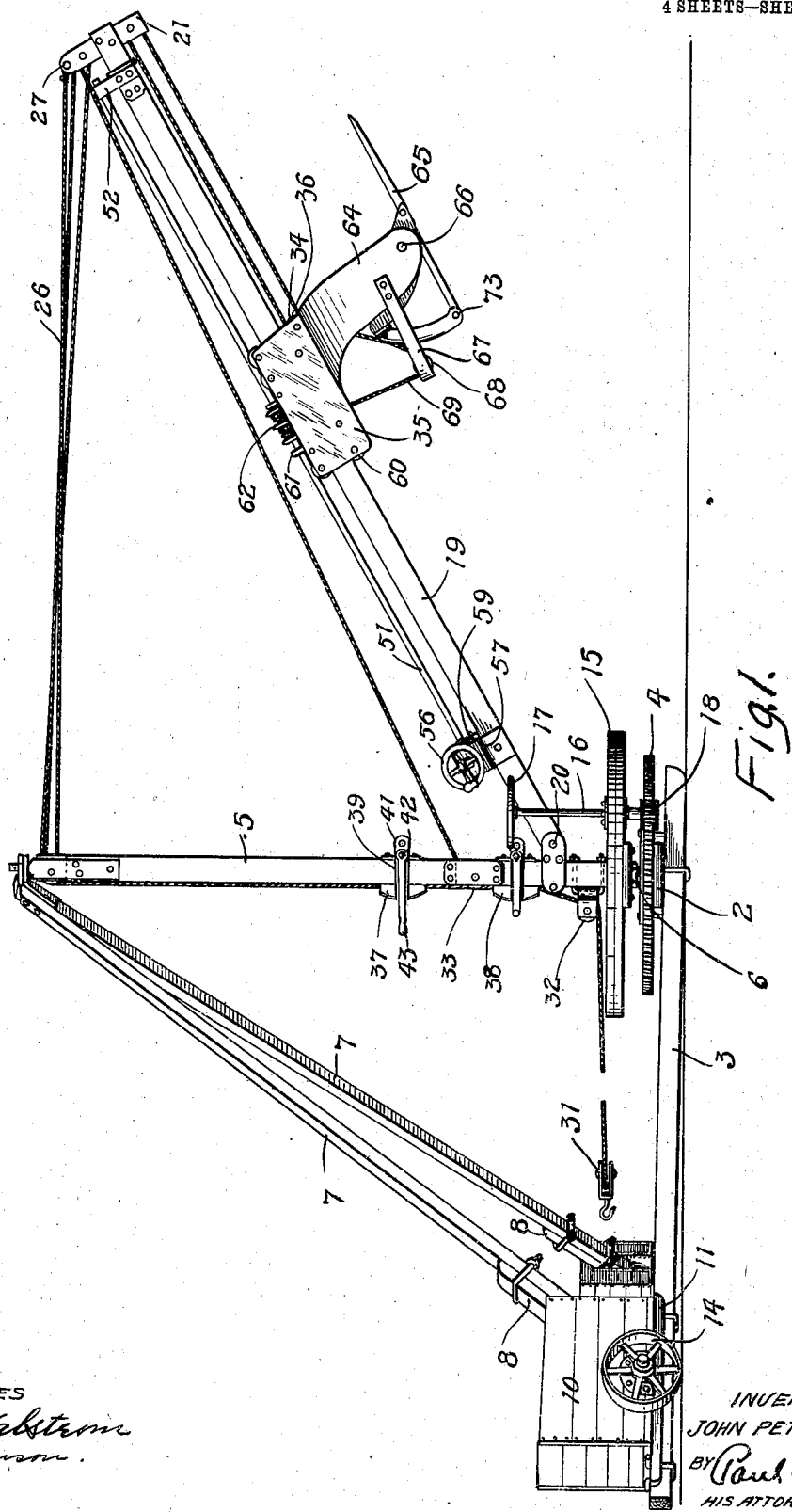
WITNESSES
INVENTOR
JOHN PETERSON.
BY
HIS ATTORNEYS.

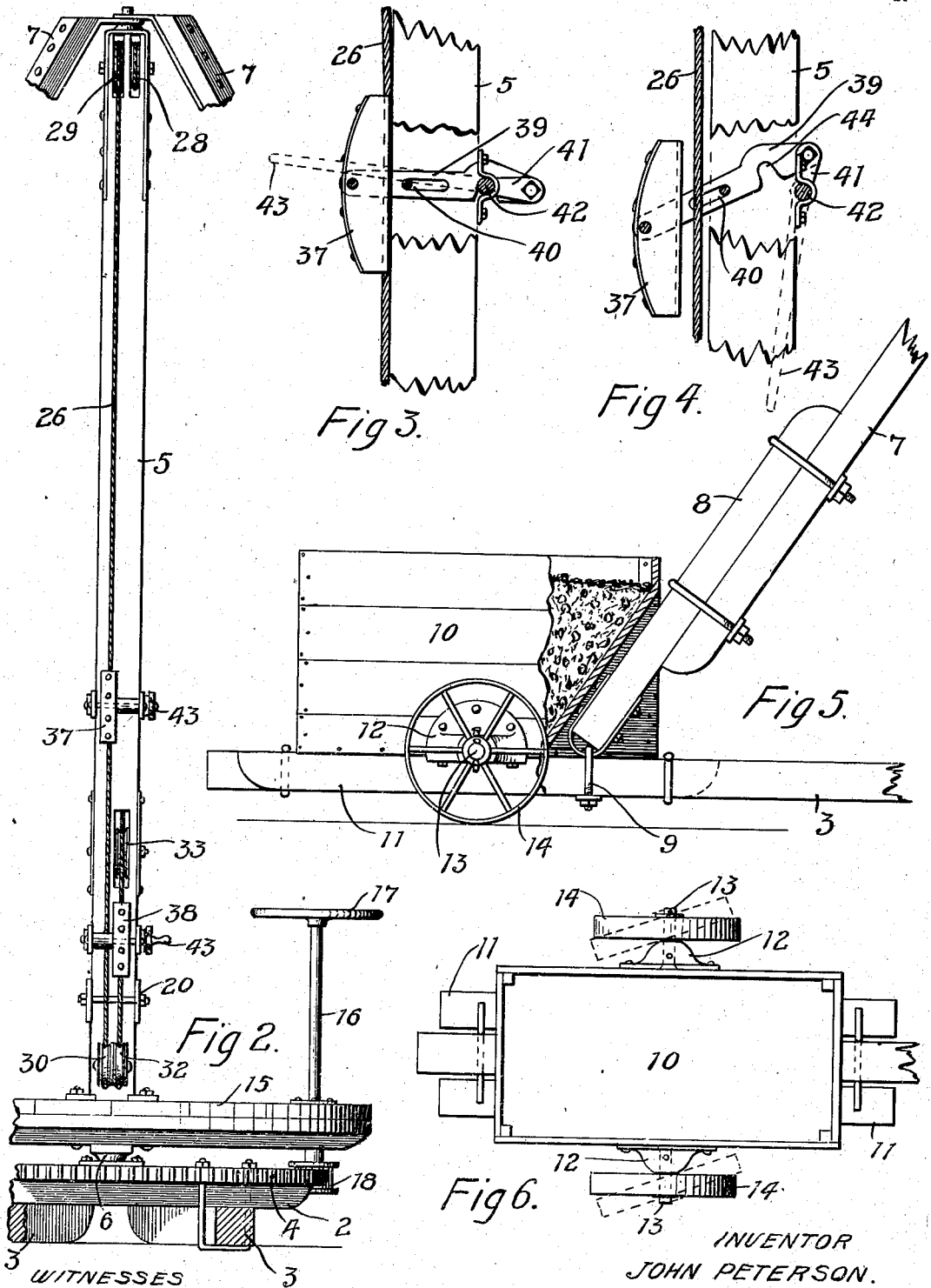

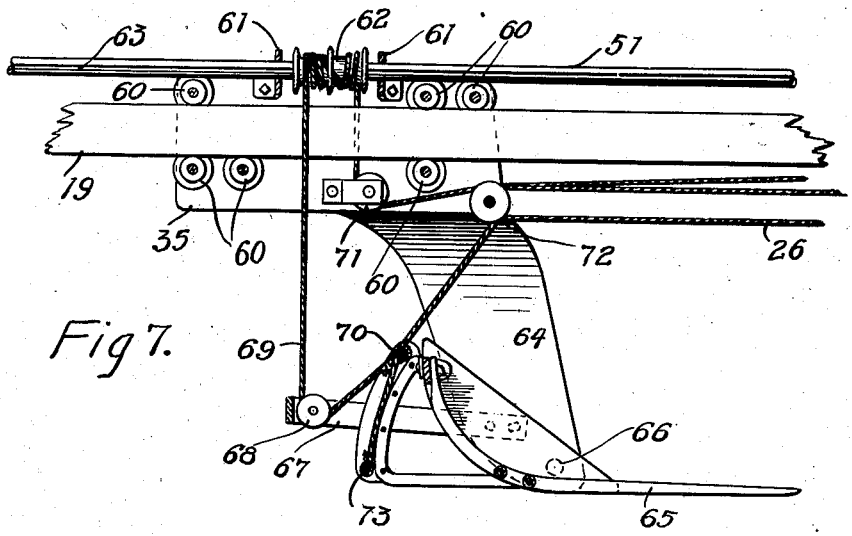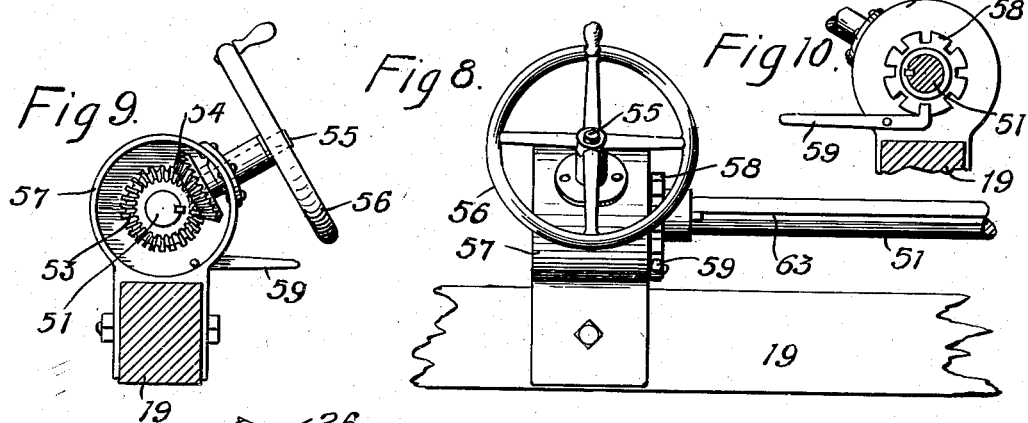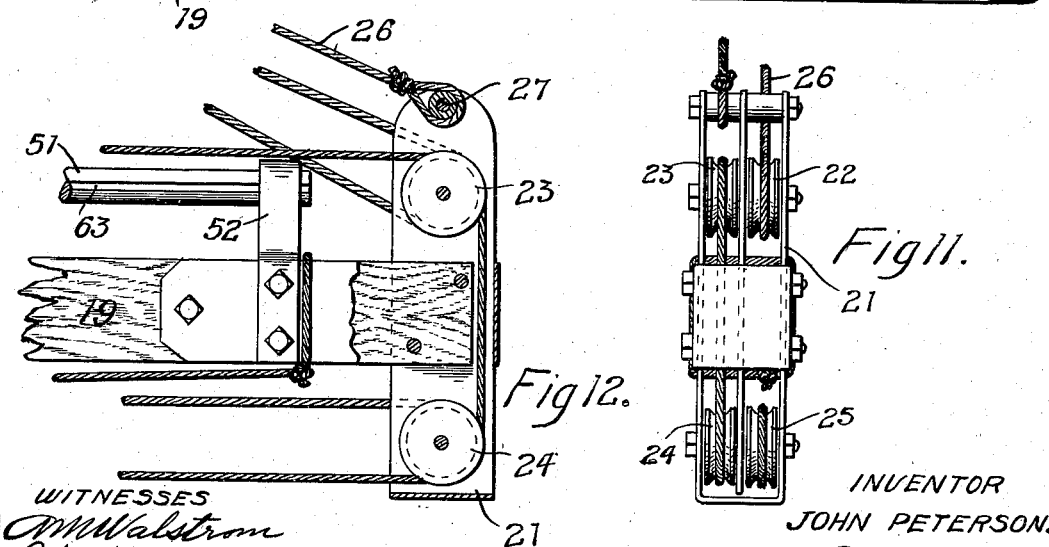

No. 858,533. PATENTED JULY 2, 1907.
J. PETERSON.
HAY AND MANURE GATHERER AND LOADER.
APPLICATION FILED FEB. 26, 1906.
4 SHEETS—SHEET 4.
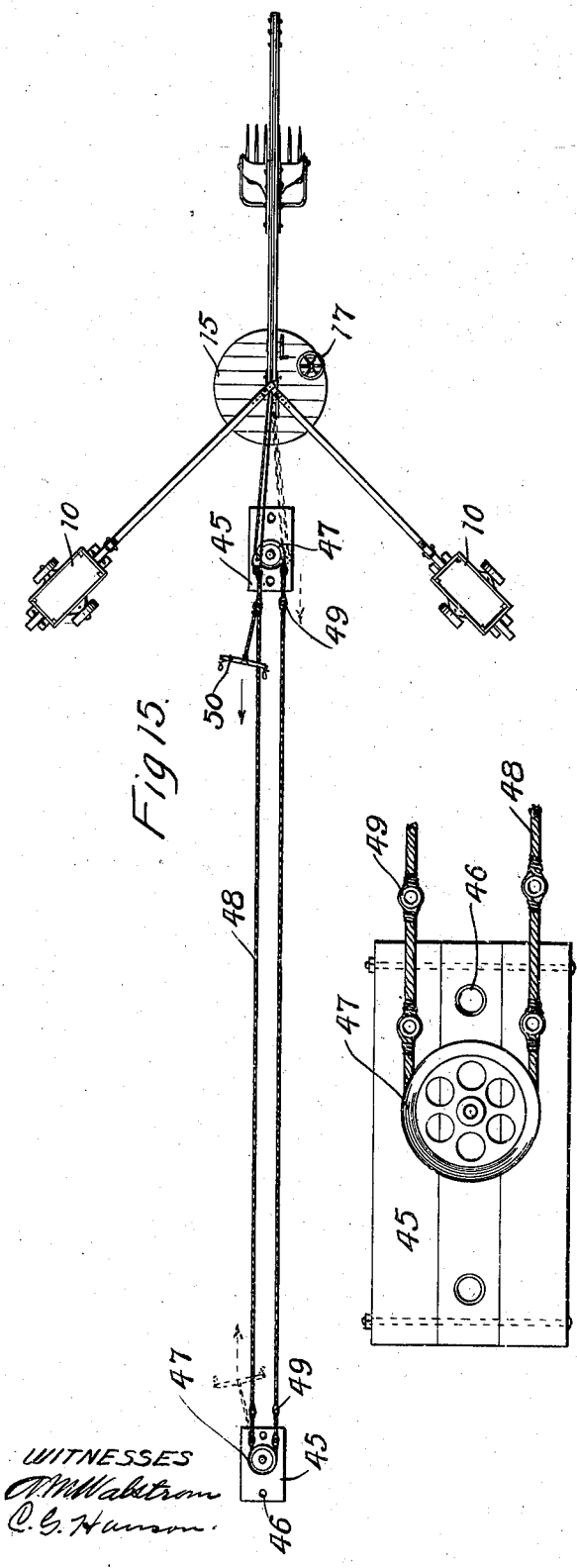
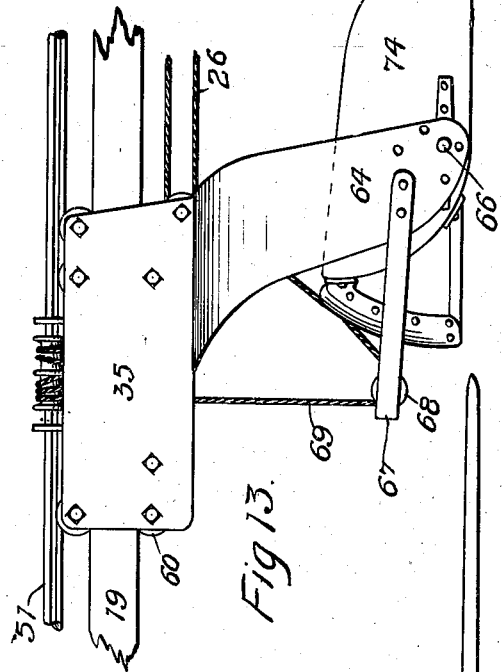
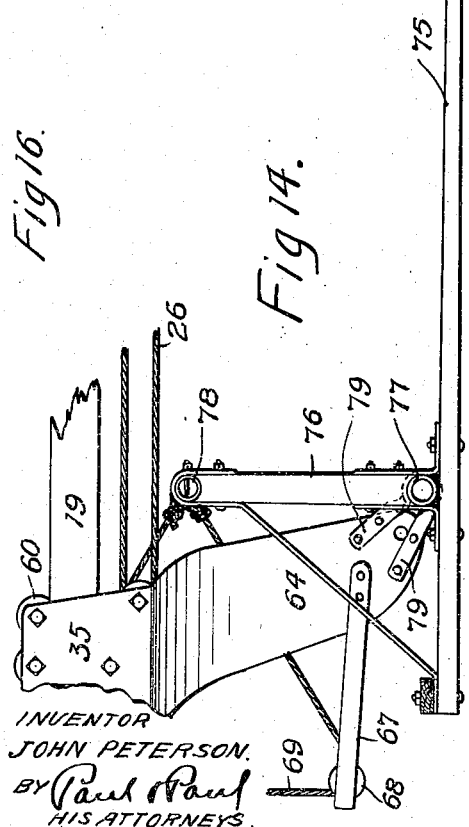
WITNESSES
INVENTOR
JOHN PETERSON.
BY
HIS ATTORNEYS.

UNITED STATES PATENT OFFICE.

JOHN PETERSON, OF ST. PAUL, MINNESOTA.

HAY AND MANURE GATHERER AND LOADER.

No. 858,533.          Specification of Letters Patent.          Patented July 2, 1907.

Application filed February 26, 1906. Serial No. 303,116.

*To all whom it may concern:*

Be it known that I, JOHN PETERSON, of St. Paul, Ramsey county, Minnesota, have invented certain new and useful Improvements in Hay and Manure Gatherers and Loaders, of which the following is a specification.

My invention relates to farm implements, and particularly to that class shown and described in a certain pending application for Letters Patent, No. 277,057, filed September 5, 1905.

The object of my invention is to provide improved means for moving the fork carrier back and forth on the boom and in tilting the fork to the desired working angle, or dumping the same when loaded.

A further object is to provide improved means for swinging the boom horizontally, and for adjusting it at the desired pitch or inclination.

Other objects of the invention will appear from the following detailed description.

The invention consists, generally, in various constructions and combinations, all as hereinafter described and particularly pointed out in the claims.

In the accompanying drawings forming part of this specification, Figure 1 is a side elevation of a hay and manure gatherer embodying my invention. Fig. 2 is an end view showing the position of the brakes on the upright mast. Figs. 3 and 4 illustrate the locked and unlocked positions of one of the brakes. Fig. 5 is a side elevation of one of the weighted boxes provided on the horizontal timbers to which the mast braces are attached. Fig. 6 is a plan view of one of the boxes illustrating the manner of mounting it and the carrying wheels thereon. Fig. 7 is a sectional view of the fork carrier and fork showing the means employed for tilting the fork. Fig. 8 is a detail view of the mechanism controlled by the operator for rotating the shaft to tilt the fork. Fig. 9 is a sectional view showing the gear connection between the shaft and the operating wheel. Fig. 10 is a detail view of the locking mechanism for the shaft. Fig. 11 is an end view of the boom showing the manner of attaching the cable thereon. Fig. 12 is a sectional view showing the end of the boom with the rope sheaves and the operating rope or cable thereon. Fig. 13 illustrates the fork carrier used in connection with a shovel or scoop. Fig. 14 shows a hay fork substituted for the scoop. Fig. 15 is a plan view showing the horse power connection for operating the boom and fork. Fig. 16 is a detail view illustrating the sheave and plate whereon it is mounted at one end of the horse power appliance.

In the drawing, 2 represents a plate connecting the contiguous ends of the horizontal timbers 3 that are adapted to be spread apart to form a base for the apparatus, or moved together to permit it to be carried through a gateway or door, or be put in compact form for storage purposes. A large gear 4 is mounted on the plate 2, and an upright mast 5 has a step 6 at its lower end concentric with said gear. The upper end of the mast 5 is connected by braces 7 with the outer ends of the horizontal timbers 3, said braces having adjustable sections 8 to permit them to be moved back and forth on the horizontal timbers, suitable couplings 9 being provided at the lower ends of said braces for the purpose of facilitating such movement. A box 10 is provided on each of the horizontal timbers 3, being held in place thereon by guides 11; and said boxes are adapted to contain material such as sand which will hold the horizontal timbers in position and prevent them from swinging back and forth when the mast is under a severe strain. The boxes are preferably provided on each side with castings 12, wherein the spindles 13 carrying wheels 14 are provided, said spindles permitting the wheels to be swung in or out to facilitate lateral movement of the boxes and the horizontal beams, as when it is desired to draw them together in passing through a gateway or door. A platform 15 is supported on the lower end of the mast, and a post 16 having an operating wheel 17 is mounted in said platform, and has a pinion 18 on its lower end which engages the gear 4, said pinion having a slight vertical movement with the post 16 to allow it to adapt itself to any slight inclination of the platform or inequalities of the ground on which the apparatus may be placed. The revolution of the pinion 18 will cause a corresponding movement of the platform and the mast whereon it is mounted. A boom 19 is pivoted at 20 on the said mast and carries a block or frame 21 at its outer end, wherein pulleys or rope sheaves 22, 23, 24 and 25 are mounted, the first two having a common axis above the end of the boom, and the other two being similarly mounted below the boom.

A rope 26 has a fixed connection at one end to a pin 27 in the top of the block 21, and extends therefrom to a sheave 28 at the top of the mast, from thence back to the sheave 22, then to the sheave 29 at the top of the mast, and from thence down beside the mast to a sheave 30 and to a block 31 and back to a sheave 32 at the foot of the mast and a sheave 33 above the pivot of the boom, then to the sheaves 23 and 24, and to a sheave 34 on the fork carrier 35, thence to the sheave 25 and a sheave 36 on the fork carrier, and back to the end of the boom where the rope is secured. One lead of this rope controls the vertical movement of the boom, while the other controls the travel of the fork carrier thereon.

I prefer to provide a brake or lock device in connection with each lead of the rope on the mast consisting of shoes 37 and 38 pivoted on bars 39 which have pin and slot connections 40 with the mast, and are attached at one end to arms 41 mounted on shafts 42 which have operating levers 43. The arms 39 have slots or recesses 44 to engage the shaft 42 when swung to a certain position, for the purpose of locking the shoes and gripping the rope between them and the mast. The shoe 37 will clamp the lead of the rope which controls the vertical movement of the boom and allows the power applied to the other portion of the rope to move the fork carrier toward the outer end of the boom, or by clamping the shoe 38 against the mast the cable leading to the fork carrier will be gripped and held, and upon releasing the other shoe the boom may be raised or lowered without changing the position of the fork carrier thereon. When both brakes are released the boom and carrier may be operated simultaneously.

For convenience in operating the boom and fork I prefer to provide a horse power apparatus consisting of plates 45 composed of a series of planks bolted together and having holes 46, through which pins are thrust to secure the plank to the ground. Sheaves 47 are mounted on the plates and connected by an endless rope or belt 48, which has rings 49 inserted therein to permit the attachment of the hook on the block 31 and a swingle-tree 50 to the belt. The position of the block 31 and the swingle-tree will be changed according to the movement desired, different adjustments being indicated in Fig. 15 by full and dotted lines. Upon the boom 19 a shaft 51 is supported, having a bearing 52 at the outer end of the boom, and a beveled gear 53 at its inner end meshing with a similar gear 54 on a shaft 55 which is operated by a hand wheel 56, said gears being inclosed within a suitable housing 57 mounted on the boom. A notched wheel 58 is provided on the said shaft, and a lever 59 has one end adapted to enter the notches in said wheel and lock the shaft against rotation in either direction. The carrier 35 is adapted to slide back and forth on the boom, being guided thereon by anti-friction wheels 60 which roll upon the upper and under surfaces of the boom allowing the carrier to be moved easily back and forth thereon, and holding it in its proper position throughout its entire movement. The carrier is drawn to the outer end of the boom by means of the rope or cable, and when the rope is made slack the carrier, with the gathering fork or scoop thereon, will slide back by gravity to the inner end.

The opposite sides of the carrier are connected by plates 61 having holes through which the shaft 51 extends, said plates sliding freely on the shaft as the carrier is moved and serving as guides therefor. Between the plates 61 a double drum 62 is arranged sliding in a keyway 63 on the said shaft and rotating therewith but locked against independent rotary movement. Instead of having a shaft with a keyway one that is polygonal in cross section may be used. When the carrier is moved in or out one of the plates 61 will engage the drum and move it along also. Upon the lower portion of the carrier I provide depending wings 64, between which a fork 65 is arranged having pivots 66 in the lower ends of said wings. This fork is the type designed for gathering manure or coarse material. A bail 67 is secured to the wings 64 and projects rearwardly therefrom, and is provided with a centrally arranged sheave 68. A rope 69 is wrapped around one end of the drum 62 and down under the sheave 68 and attached at 70 on the rear end of the fork 65 and above the normal level of the load thereon. The other end of the rope 69 is wrapped around the opposite end of the drum 62 and down around sheaves 71 and 72 and attached at 73 to the rear end of the fork on a level substantially with the bottom of the same. The fork will by gravity tend to swing to the position indicated in Fig. 7, but by rotating the shaft 51 the fork can be tilted up or down as desired. The operator, therefore, standing on the platform 15 can depress the nose of the fork to facilitate the gathering of the load, raise it when loaded, and elevate the rear portion of the fork to discharge its contents when the carrier has been moved to the point where it is desired to place the load. The operator will thus have perfect control over the fork, and can elevate or depress its nose and adjust it at any desired angle to obtain the best results.

In place of the fork with tines I may provide a scoop or shovel 74 pivotally supported between the wings 64 and operating substantially in the same manner as the fork, the scoop being designed particularly for handling fine material which cannot be conveniently gathered up by the fork.

In Fig. 14 I have shown a hay fork consisting of a series of long tines 75 and upright standards 76 connected by rods 77 and 78. Straps 79 are secured to the wings 64 and are placed around the rod 77 and form pivotal supports for the fork permitting it to be tilted in gathering or discharging its load. The rope 69 is placed around the sheaves in the manner already described, and has both ends attached to the rod 78. The hay fork is moved back and forth on the boom with the sliding carrier in the same manner as described with reference to the manure fork.

I claim as my invention:

1. The combination with a mast and boom, of a carrier supported by said boom and movable lengthwise thereon, a gathering fork mounted in said carrier, an operating rope or cable connected to said boom and to said carrier and having suitable sheaves on said boom and mast and a suitable power attachment, and means mounted on said mast for locking one lead of the rope whereby when power is applied to the rope the boom or carrier will be operated, substantially as described.

2. The combination with a mast and boom having suitable sheaves, of a carrier supported upon said boom and movable lengthwise thereof, a gathering device carried by said carrier, a cable attached to said boom and carrier and passing over said sheaves and having a suitable power attachment, and brake devices mounted on said mast arranged to clamp the lead of the cable running to said boom and carrier and whereby either said boom or said carrier may be operated independently of the other, substantially as described.

3. The combination with a mast and boom having suitable sheaves of a carrier slidably supported on said boom, a gathering device mounted in said carrier, a cable having its ends attached to said boom and carrier and movable over said sheave and arranged to operate said boom and carrier simultaneously when power is applied, and brake devices mounted on said mast and arranged to clamp said cable and lock the portion thereof leading to said boom and mast whereby when one only of said brake devices is in its locked position a portion of the cable is free to move and operate said boom or said carrier, substantially as described.

4. The combination with a mast and boom, of a carrier mounted upon said boom to move lengthwise thereof, a gathering device mounted in said carrier, an operating cable passing over sheaves provided on said mast and boom and connected with said boom and carrier, a shaft mounted on said boom, means for rotating the same, and means connecting said shaft and said gathering device for tilting the same when said shaft is rotated, substantially as described.

5. The combination with a mast and boom having suitable sheaves, of a carrier supported on said boom and movable lengthwise thereof, a gathering device mounted in said carrier, an operating cable passing over said sheaves and connected with said boom and carrier, and means for raising or depressing the nose of said gathering device independently of its movement with said carrier, and said means comprising a revolving drum movable lengthwise of said boom and a rope having its middle portion wrapped around said drum and its ends attached to said gathering device, substantially as described.

6. The combination with a boom, of a carrier mounted thereon and movable lengthwise thereof, a gathering device pivotally supported in said carrier, and means for tilting said gathering device to depress or raise the nose of the same, and said means comprising a revoluble, slidable drum having a flexible connection with said gathering device, for the purpose specified.

7. The combination with a boom, of a carrier slidably supported thereon, a gathering device pivoted in said carrier, a shaft mounted on said boom, means for rotating said shaft, and means connecting said shaft with said pivoted gathering device to raise or depress the nose thereof when said shaft is rotated, substantially as described.

8. The combination with a pivoted boom, of a carrier slidably supported thereon, a gathering device pivoted in said carrier, a shaft mounted on said boom and having a gear at one end, a post having a gear to mesh with the gear on said shaft and provided with an operating wheel, and means connecting said shaft with said gathering device, for the purpose specified.

9. The combination with a boom, of a carrier mounted thereon and movable lengthwise thereof, a gathering device pivoted in said carrier, a shaft mounted on said boom and having a keyway, a drum slidably supported on said shaft in said keyway, a cable connecting said boom and carrier with a suitable source of power, and a rope having its middle portion wrapped around said drum and its ends attached to said gathering device whereby said gathering device will be oscillated to depress or raise the nose of the same when said shaft is rotated, substantially as described.

10. The combination with a pivoted boom, of a carrier slidably supported thereon, an operating cable connected with said carrier, a shaft mounted on said boom, means for rotating said shaft, a drum slidable lengthwise on said shaft but locked against independent rotary movement thereon, means mounted on said carriage for engaging said drum and moving the same lengthwise on said shaft when said carrier is operated, a pivoted gathering device mounted in said carrier and a rope wrapped around said drum and connected with said gathering device and whereby its nose may be depressed or elevated by the rotation of said shaft.

11. The combination with a boom, of a carrier slidably supported thereon and having depending wings, a gathering fork having pivots intermediate to its ends on said wings, an operating cable connected with said carrier, and means slidably mounted on said boom and having a flexible connection with said fork for tilting said gathering fork independently of its movement with said carrier, substantially as described.

12. The combination with the horizontal timbers and means connecting them at one end, of a comparatively large gear secured on said timbers, a mast having a step concentric with said gear, a platform carried by said mast above said gear and projecting outwardly beyond the same, a post mounted in said platform near its periphery and having a pinion below said platform to engage said gear and an operating wheel at its upper end, a boom pivoted on said mast, a carrier slidably supported thereon, and an operating cable connected with said boom and carrier and with a suitable source of power, for the purpose specified.

13. The combination, with a pivoted boom, of a carrier movable lengthwise thereon, an operating cable connected with said carrier, a gathering device mounted in said carrier and movable therewith on said boom, means arranged to move back and forth on said boom and connected with said gathering device for depressing or elevating the nose of the same, and means within control of the operator for actuating said elevating and depressing means, substantially as described.

14. The combination, with a pivoted boom, of a carrier movable thereon, a cable connected with said carrier, a gathering device mounted in said carrier, means mounted on said boom and movable lengthwise thereof and connected with said gathering device for elevating or depressing the nose of the same, and means provided on said carrier and arranged to engage said elevating and depressing device, whereby it will be moved back and forth on the boom simultaneously with said carrier.

15. The combination, with a pivoted boom, of a carrier movable lengthwise thereon, an operating cable connected with said carrier, a gathering device mounted in said carrier, a drum slidable lengthwise of said boom and having a flexible connection with said gathering device, means for rotating said drum and means whereby when said carrier is operated, said drum will be moved also.

In witness whereof, I have hereunto set my hand this 21st day of February 1906.

JOHN PETERSON.

Witnesses:
RICHARD PAUL,
C. G. HANSON.